(12) United States Patent
Miyake (10) Patent No.: US 12,472,715 B2
(45) Date of Patent: Nov. 18, 2025

(54) DAMAGE EVALUATION DEVICE AND DAMAGE EVALUATION METHOD FOR PRESS-FORMING DIE

(71) Applicant: JFE STEEL CORPORATION, Tokyo (JP)

(72) Inventor: Hiroto Miyake, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 246 days.

(21) Appl. No.: 18/276,370

(22) PCT Filed: Mar. 4, 2022

(86) PCT No.: PCT/JP2022/009295
§ 371 (c)(1),
(2) Date: Aug. 8, 2023

(87) PCT Pub. No.: WO2022/196385
PCT Pub. Date: Sep. 22, 2022

(65) Prior Publication Data
US 2024/0123700 A1  Apr. 18, 2024

(30) Foreign Application Priority Data

Mar. 16, 2021 (JP) ................................ 2021-042002

(51) Int. Cl.
*B30B 15/28* (2006.01)
*B30B 9/28* (2006.01)
*B30B 15/02* (2006.01)

(52) U.S. Cl.
CPC ................ *B30B 15/28* (2013.01); *B30B 9/28* (2013.01); *B30B 15/02* (2013.01)

(58) Field of Classification Search
CPC ......... G01L 1/18; G01L 1/125; G01L 1/2287; G01L 5/24; G01L 1/2206; G01L 1/16;
(Continued)

(56) References Cited

U.S. PATENT DOCUMENTS 11,536,637 B2     12/2022  Kobayashi et al.
12,275,053 B2*    4/2025   Miyake .................. B21D 28/02
(Continued)

FOREIGN PATENT DOCUMENTS

CN     101819118 A     9/2010
CN     107687984 A     2/2018
(Continued)

OTHER PUBLICATIONS

May 15, 2024 Extended European Search Report Issued in European Patent Application No. 22771139.7.
(Continued)

*Primary Examiner* — Andre J Allen
(74) *Attorney, Agent, or Firm* — Oliff PLC (57) ABSTRACT

A damage evaluation device for a press-forming die includes: evaluation dies installed in a pressing device configured to press-form a metal material; and an observation device configured to observe damage behavior of a die steel material and surface coating constituting the evaluation dies. The evaluation dies include: a perforating unit configured to form a hole in the metal material; a first shearing unit configured to shear the metal material in which the hole is formed into a predetermined metal component shape; and a second shearing unit configured to separate a metal component from the metal material, and dies of the perforating unit, the first shearing unit and the second shearing unit are formed of the die steel material and have a structure that enables replacement with another die made of predetermined material and applied with predetermined surface coating treatment.

6 Claims, 7 Drawing Sheets

(58) Field of Classification Search
CPC ..... G01L 1/225; G01L 1/2281; G01L 1/2293;
G01L 1/24; G01L 1/20; G01L 1/22;
G01L 1/142; G01L 1/127; G01L 5/0033;
G01L 1/14; G01L 5/0047; G01L 1/26;
G01L 5/0004; G01L 1/242; G01L 1/241;
G01L 1/246; G01L 1/2231; G01L 1/2262;
G01L 5/0076; G01L 5/0038; G01L 1/005;
G01L 5/00; G01L 1/2218; G01L 5/246;
G01L 3/102; G01L 5/243; G01L 1/205;
G01L 9/0054; G01L 1/255; G01L 5/102;
G01L 3/105; G01L 5/0052; G01L 5/10;
G01L 5/162; G01L 5/0061; G01L 5/0042;
G01L 9/0042; G01L 9/0055; G01L
1/2268; G01L 25/00; G01L 9/065; G01L
1/2243; G01L 5/0019; G01L 1/144; G01L
5/101; G01L 1/04; G01L 1/162; G01L
5/103; G01L 5/0057; G01L 5/1627; G01L
1/2225; G01L 1/247; G01L 1/00; G01L
5/165; G01L 3/10; G01L 1/2212; G01L
3/108; G01L 5/0085; G01L 5/107; G01L
9/0052; G01L 5/161; G01L 1/10; G01L
1/12; G01L 11/02; G01L 1/02; G01L
1/06; G01L 1/106; G01L 1/148; G01L
11/025; G01L 5/228; G01L 1/146; G01L
1/165; G01L 1/245; G01L 9/0002; G01L
19/147; G01L 5/06; G01L 1/2237; G01L
5/04; G01L 5/047; G01L 9/0073; G01L
9/0075; G01L 1/2256; G01L 5/225; G01L
9/0072; G01L 1/243; G01L 25/003; G01L
9/0051; G01L 1/248; G01L 19/0092;
G01L 5/0028; G01L 5/042; G01L 5/045;
G01L 5/108; G01L 5/223; G01L 1/25;
G01L 5/008; G01L 5/167; G01L 9/045;
G01L 9/16; G01L 3/12; G01L 5/106;
G01L 5/12; G01L 9/0022; G01L 9/0098;
G01L 9/06; G01L 1/183; G01L 19/04;
G01L 1/2275; G01L 5/22; G01L 5/226;
G01L 9/04; G01L 5/16; G01L 5/0071;
G01L 5/136; G01L 19/148; G01L 9/0019;
G01L 19/02; G01L 5/0009; G01L 9/002;
G01L 3/103; G01L 3/104; G01L 5/28;
G01L 9/007; G01L 9/12; G01L 1/186;
G01L 19/084; G01L 23/18; G01L 5/105;
G01L 19/086; G01L 3/242; G01L 5/221;
G01L 9/0001; G01L 9/0061; G01L 1/044;
G01L 1/122; G01L 5/0066; G01L 5/08;
G01L 9/125; G01L 9/0035; G01L 1/042;
G01L 23/10; G01L 3/101; G01L 19/0038;
G01L 3/24; G01L 5/0014; G01L 5/009;
G01L 5/133; G01L 5/164; G01L 9/006;
G01L 9/0077; G01L 9/008; G01L 9/08;
G01L 13/025; G01L 3/106; G01L 3/1457;
G01L 5/14; G01L 19/0636; G01L 19/146;
G01L 9/0041; G01L 1/103; G01L 27/002;
G01L 3/1428; G01L 3/1478; G01L 5/13;
G01L 9/0014; G01L 9/0079; G01L 9/10;
G01L 1/167; G01L 11/04; G01L 19/0645;
G01L 19/14; G01L 3/00; G01L 3/045;
G01L 3/1435; G01L 9/0005; G01L
9/0013; G01L 9/0025; G01L 9/0048;
G01L 9/0076; G01L 19/0007; G01L
19/083; G01L 3/14; G01L 3/1485; G01L
3/247; G01L 5/26; G01L 7/00; G01L
9/005; G01L 9/0064; G01L 11/00; G01L
11/06; G01L 17/005; G01L 19/003; G01L
27/005; G01L 5/03; G01L 9/02; G01L
1/046; G01L 11/006; G01L 17/00; G01L
19/0061; G01L 19/08; G01L 25/006;
G01L 3/02; G01L 3/04; G01L 3/08;
G01L 3/109; G01L 5/0023; G01L 5/169;
G01L 7/024; G01L 7/16; G01L 9/0023;
G01L 13/023; G01L 19/00; G01L
19/0046; G01L 23/08; G01L 23/22; G01L
3/1471; G01L 5/166; G01L 5/18; G01L
5/20; G01L 7/082; G01L 7/18; G01L
9/00; G01L 9/0004; G01L 9/0027; G01L
9/0047; G01L 9/14; G01L 9/18; G01L
1/048; G01L 1/08; G01L 1/083; G01L
1/086; G01L 11/008; G01L 19/0069;
G01L 19/0618; G01L 19/0627; G01L
19/141; G01L 19/143; G01L 19/145;
G01L 19/16; G01L 21/00; G01L 21/02;
G01L 21/20; G01L 23/02; G01L 23/12;
G01L 23/16; G01L 27/00; G01L 3/1414;
G01L 3/1464; G01L 3/16; G01L 3/22;
G01L 5/163; G01L 5/286; G01L 7/04;
G01L 7/043; G01L 7/08; G01L 7/084;
G01L 7/10; G01L 9/0007; G01L 9/0008;
G01L 9/0017; G01L 9/0038; G01L
9/0044; G01L 9/0045; G01L 9/0082;
G01L 9/0083; G01L 9/0086; G01L
9/0092; G01L 9/025; G01L 15/00; G01L
19/0023; G01L 19/0654; G01L 19/0681;
G01L 19/069; G01L 19/142; G01L
23/222; G01L 3/1492; G01L 3/18; G01L
5/1623; G01L 5/171; G01L 5/173; G01L
7/02; G01L 7/022; G01L 7/166; G01L
9/003; G01L 9/0036; G01L 9/105; B30B
15/0094; B30B 11/005; B30B 11/08;
B30B 15/281; B30B 15/14; B30B 15/16;
B30B 15/26; B30B 15/28; B30B 1/265;
B30B 15/18; B30B 1/14; B30B 1/20;
B30B 1/32; B30B 1/326; B30B 11/00;
B30B 11/002; B30B 11/027; B30B
11/085; B30B 11/34; B30B 12/00; B30B
15/00; B30B 15/045; B30B 15/068; B30B
15/22; B30B 15/284; B30B 15/34; B30B
3/00; B30B 7/02; B30B 9/047; B30B
9/301; B30B 9/3042; B30B 1/18; B30B
1/186; B30B 15/0035; B30B 15/04; B30B
15/12; B30B 15/148; B30B 7/04
USPC .................................................. 73/760–780
See application file for complete search history.

(56) References Cited

U.S. PATENT DOCUMENTS

| | | |
|---|---|---|
| 2008/0229893 A1 | 9/2008 | Shepard et al. |
| 2014/0023740 A1 | 1/2014 | Kashi et al. |
| 2020/0238357 A1 | 7/2020 | Kubo et al. |
| 2021/0372899 A1 | 12/2021 | Kobayashi et al. |
| 2022/0250177 A1 | 8/2022 | Yasutomi et al. |

FOREIGN PATENT DOCUMENTS

| | | | | |
|---|---|---|---|---|
| CN | 109477780 A | | 3/2019 | |
| CN | 111148856 A | | 5/2020 | |
| CN | 112387785 A | * | 2/2021 | ......... B21B 15/0007 |
| CN | 119510167 A | * | 2/2025 | ............ G01N 1/286 |
| ES | 2663233 T3 | * | 4/2018 | ............ B21D 22/02 |
| JP | 107-21216 U | | 4/1995 | |

(56) References Cited

FOREIGN PATENT DOCUMENTS

| | | | | |
|---|---|---|---|---|
| JP | 2002035885 A | * | 2/2002 | |
| JP | 2005125347 A | * | 5/2005 | ......... B30B 15/0088 |
| JP | 2005-305510 A | | 11/2005 | |
| JP | 2010-167437 A | | 8/2010 | |
| JP | 4677804 B2 | | 4/2011 | |
| JP | 4737606 B2 | | 8/2011 | |
| JP | 2011-189419 A | | 9/2011 | |
| JP | 5135479 B2 | | 2/2013 | |
| JP | 2015-048651 A | | 3/2015 | |
| JP | 2018-164936 A | | 10/2018 | |
| JP | 2020-82190 A | | 6/2020 | |
| JP | 2024155441 A | * | 10/2024 | |
| KR | 20070070441 A | | 7/2007 | |
| KR | 10-2021-0000480 A | | 1/2021 | |
| KR | 102348564 B1 | * | 1/2022 | ............. B21D 37/10 |
| WO | WO-2014092273 A1 | * | 6/2014 | ............. B21D 24/16 |
| WO | 2020/183882 A1 | | 9/2020 | |

OTHER PUBLICATIONS

May 17, 2022 International Search Report issued in International Patent Application No. PCT/JP2022/009295.
Aug. 14, 2025 Office Action issued in Korean Patent Application No. 10-2023-7031323.
Aug. 25, 2025 Office Action issued in Chinese Patent Application No. 202280020993.1.

* cited by examiner

DAMAGE EVALUATION DEVICE AND DAMAGE EVALUATION METHOD FOR PRESS-FORMING DIE

FIELD

The present invention relates to a damage evaluation device and a damage evaluation method for a press-forming die.

BACKGROUND

In recent years, a high-tensile steel sheet having high strength has been applied to vehicle body frame components of vehicles from the viewpoint of weight reduction of the vehicle body and improvement of the collision safety. In general, vehicle body frame components are mass-produced by press-forming using dies. However, since high-tensile steel sheets have poor ductility and high strength, cracks, wrinkles, or spring back (poor dimensional accuracy) is remarkably generated by press-forming. Therefore, it is necessary to take measures against such forming defects. When a high-tensile steel sheet is press-formed, not only forming defects as described above but also a die damage is one of major problems.

In general, in a case where the strength of a material increases, a load required for shearing for cutting the material increases, and in press-forming using a die, a contact surface pressure to the die increases. Therefore, chipping or wear of the dies steel material, seizure of the material, or the like is likely to occur. In addition, if press-forming is continued in a state where the die is damaged, not only the appearance of the press-formed product is impaired, but also the quality of the sheared surface is deteriorated, which may greatly affect the formability in a next press-forming step, hydrogen embrittlement resistance after the product is formed, or the like. From such a background, measures against die damages such as chipping, wear, and seizure of a die steel material or a surface coating film are proposed.

Specifically, Patent Literature 1 describes a method of applying a coating treatment by a physical vapor deposition (PVD) method to a formed surface in contact with a steel sheet in order to prevent seizure during press-forming. Moreover, Patent Literatures 2 and 3 describe die steel materials in which die damages are made less likely to occur through optimization of components. Furthermore, Patent Literature 4 describes a method of evaluating die galling properties by sandwiching a band-shaped steel sheet by steel blocks facing to each other, drawing out the steel sheet in this state, and then observing a surface or the like of the steel blocks. In addition, Patent Literature 5 describes evaluation dies for evaluating die galling properties by performing press-forming with dies including a punch having three or more recessed parts on the outer periphery as viewed in parallel to a pressing direction and a fitting part into which a punch relatively moved in the pressing direction is fitted with a predetermined clearance.

CITATION LIST

Patent Literature

Patent Literature 1: JP 5135479 B2
Patent Literature 2: JP 2011-189419 A
Patent Literature 3: JP 4737606 B2
Patent Literature 4: JP 4677804 B2
Patent Literature 5: JP 2010-167437 A

SUMMARY

Technical Problem

As described in Patent Literatures 1 to 3, it is effective to adopt a die steel material having excellent durability or to perform a coating treatment as a countermeasure against die damages. However, in recent years, steel materials for dies and a coating treatment are provided from various manufacturers, and it is difficult to select which die steel material and coating treatment are effective. Meanwhile, the number of times of a sliding test or a press-forming test performed in the methods described in Patent Literatures 4 and 5 is limited to about several tens to several hundred times. For this reason, it is insufficient for evaluation of die damages occurring in several thousands to several tens of thousands of times of press-forming that is performed in actual mass production press-forming, and it is difficult to quantitatively evaluate the die life such as that a die damage occurs when press-forming is performed predetermined number of times.

The present invention has been made in view of the above problems, and an object of the invention is to provide a damage evaluation device and a damage evaluation method for a press-forming die that are capable of quantitatively evaluating a die damage for predetermined die steel material and coating treatment.

Solution to Problem

A damage evaluation device for a press-forming die according to the present invention includes: evaluation dies installed in a pressing device configured to press-form a metal material; and an observation device configured to observe damage behavior of a die steel material and surface coating constituting the evaluation dies, wherein the evaluation dies include: a perforating unit configured to form a hole in the metal material; a first shearing unit configured to shear the metal material in which the hole is formed into a predetermined metal component shape; and a second shearing unit configured to separate a metal component from the metal material, and dies of the perforating unit, the first shearing unit and the second shearing unit are formed of the die steel material and have a structure that enables replacement with another die made of predetermined material and applied with predetermined surface coating treatment.

The evaluation dies may include: a press-forming unit configured to press-form the metal material after shearing by the first shearing unit into a shape having a hat-shaped cross-section, the shape having a top portion face, vertical wall portions continuous with the top portion face, and flange portions continuous with the vertical wall portions; and a third shearing unit configured to shear a part of the flange portions, dies of the press-forming unit and the third shearing unit may be formed of the die steel material and have a structure that enables replacement with another die made of predetermined material and applied with predetermined surface coating treatment, and the second shearing unit may be configured to separate a metal component having the shape having the hat-shaped cross-section from the metal material after shearing by the third shearing unit.

The shape having the hat-shaped cross-section may have a protruding shape on one of the vertical wall portions.

A damage evaluation method for a press-forming die according to the present invention includes: a step of observing damage behavior of a die steel material and surface coating constituting evaluation dies after press-forming is repeated on a metal material for predetermined number of times using the evaluation dies installed in a pressing device, wherein the evaluation dies include: a perforating unit configured to form a hole in the metal material; a first shearing unit configured to shear the metal material in which the hole is formed into a predetermined metal component shape; and a second shearing unit configured to separate a metal component from the metal material, and dies of the perforating unit, the first shearing unit and the second shearing unit are formed of the die steel material and have a structure that enables replacement with another die made of predetermined material and applied with predetermined surface coating treatment.

The evaluation dies may include: a press-forming unit configured to press-form the metal material after shearing by the first shearing unit into a shape having a hat-shaped cross-section, the shape having a top portion face, vertical wall portions continuous with the top portion face, and flange portions continuous with the vertical wall portions; and a third shearing unit configured to shear a part of the flange portions, dies of the press-forming unit and the third shearing unit may be formed of the die steel material and have a structure that enables replacement with another die made of predetermined material and applied with predetermined surface coating treatment, and the second shearing unit may be configured to separate a metal component having the shape having the hat-shaped cross-section from the metal material after shearing by the third shearing unit.

The shape having the hat-shaped cross-section may have a protruding shape on one of the vertical wall portions.

Advantageous Effects of Invention

According to a damage evaluation device and a damage evaluation method for a press-forming die according to the present invention, it is possible to quantitatively evaluate a die damage for predetermined die steel material and coating treatment.

DESCRIPTION OF EMBODIMENTS

Hereinafter, a damage evaluation device and a damage evaluation method for a press-forming die according to an embodiment of the present invention will be described with reference to the drawings.

[Overall Structure]

First, the overall structure of the damage evaluation device for a press-forming die according to the embodiment of the invention will be described with reference to FIG. 1.

Figure 1:
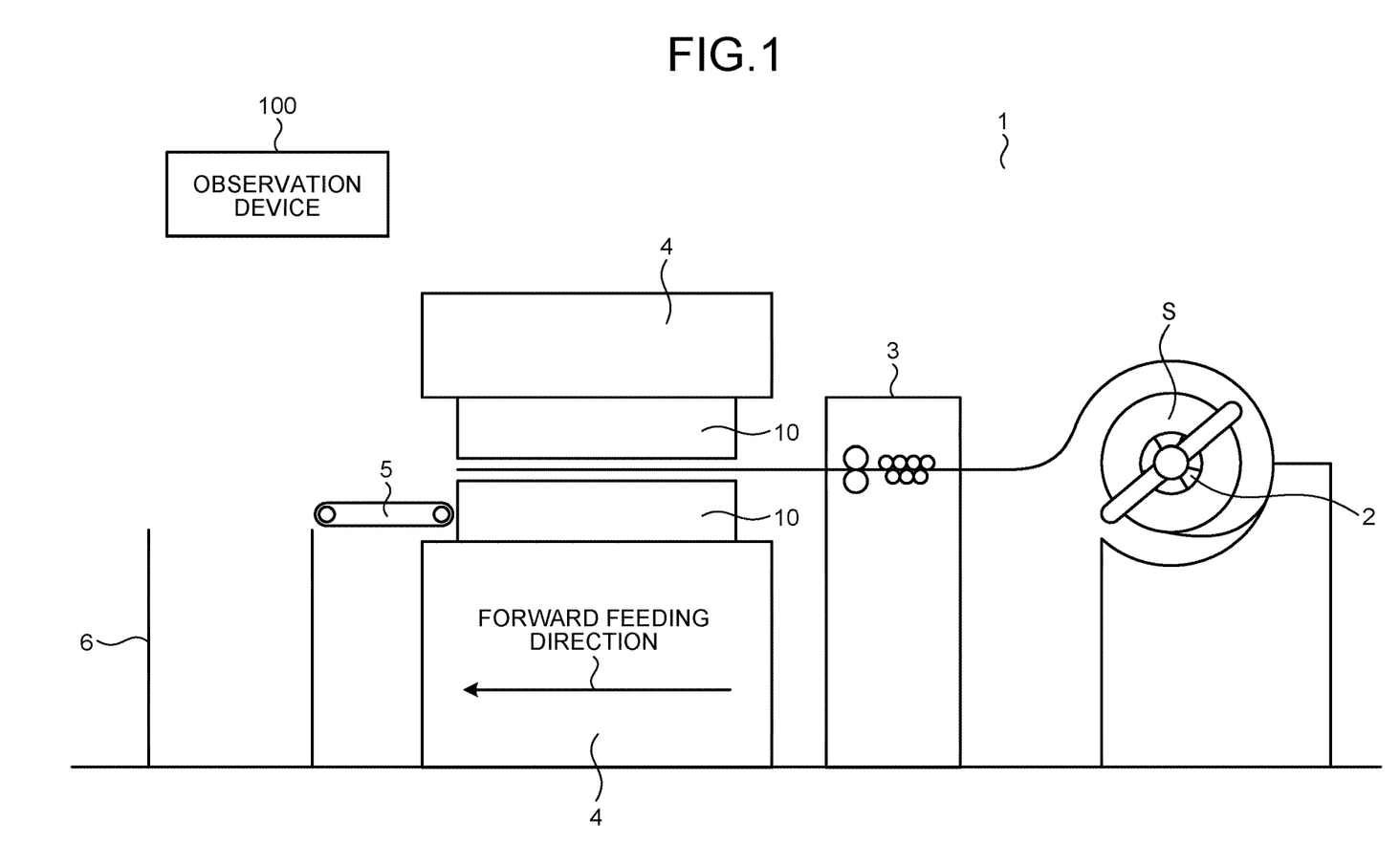
FIG. 1 is a schematic diagram illustrating an overall structure of a damage evaluation device for a press-forming die according to an embodiment of the present invention.

FIG. 1 is a schematic diagram illustrating the overall structure of the damage evaluation device for a press-forming die according to the embodiment of the invention. As illustrated in FIG. 1, a damage evaluation device 1 for a press-forming die according to the embodiment of the invention includes a pay-off reel 2, an uncoiler leveler 3, a pressing device 4, a conveyance device 5, a scrap bag 6, and an observation device 100. In the damage evaluation device 1 for a press-forming die as the embodiment of the invention, a coiled metal material (hereinafter, referred to as a coil material) S (mainly a high-tensile steel sheet) to be press-formed is set in the pay-off reel 2, and, first, the coil material S that is unwound is supplied to the uncoiler leveler 3. Next, the coil material S that has been straightened by the uncoiler leveler 3 is sent to the inside of evaluation dies 10 attached to the pressing device 4. Next, after the coil material S is press-formed using the evaluation dies 10, the coil material S is fed in the forward feeding direction by a predetermined pitch, and similar press-forming is repeated. Next, although the coil material S sent to the inside of the evaluation dies 10 is continuous, the coil material S is separated into component units in the final step of the evaluation dies 10, carried out to the outside of the pressing device 4 by the conveyance device 5, and then sent to the scrap bag 6 or the like. Then, the damage behavior of the die steel material and the surface coating constituting the evaluation dies 10 is observed using the observation device 100.

[Evaluation Die]

Figure 2:
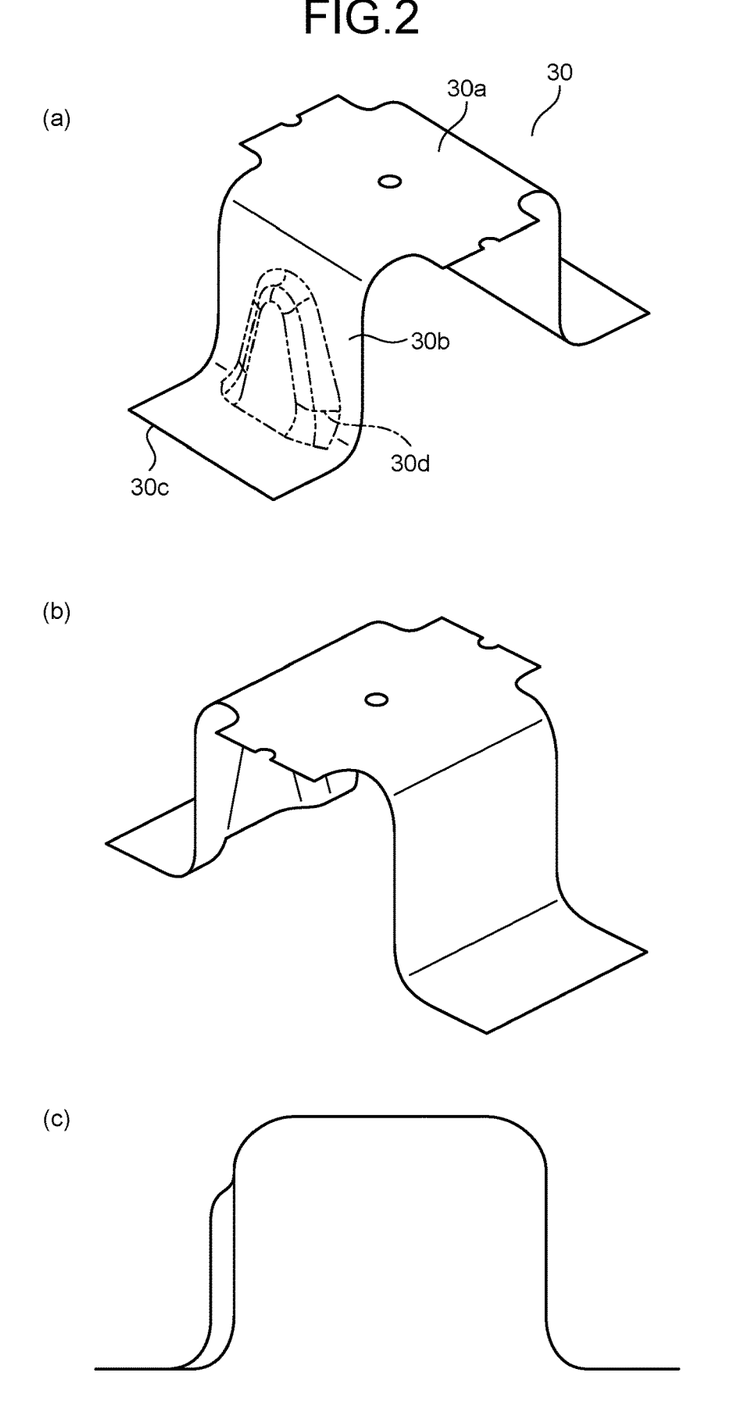
FIG. 2 is a diagram illustrating the structure of a cross-section-hat-shaped component.

Next, the structure of the evaluation dies 10 will be described with reference to FIGS. 2 to 7. Note that, in the following description, evaluation dies for continuously press-forming a cross-section-hat-shaped component 30 as illustrated in FIGS. 2(a) to 2(c) will be described as an example. As illustrated in FIGS. 2(a) to 2(c), the cross-section-hat-shaped component 30 includes a top portion face 30a, vertical wall portions 30b and flange portions 30c continuously formed from the top portion face 30a, and a joggle shape 30d formed on one of the vertical wall portions 30b. When the cross-section-hat-shaped component 30 is press-formed, a high-tensile steel sheet having a tensile strength higher than or equal to 980 MPa in which a die damage significantly occurs is basically used as the coil material S, however, any material may be used. In addition, the width of the coil material S is, for example, about 200 mm in a case where the width of the top portion face is 50 mm, the height of the vertical wall is 50 mm, and the length of the flange is about 30 mm and may be determined from the size of the component to be press-formed. Moreover, the surface of the coil material S may be either a non-plated material or a plated material. In the case of a non-plated material, it is possible to evaluate the behavior of a die damage caused by seizure of the material to the die by press-forming. Meanwhile, in the case of a plated material, a hot-dip galvanized steel sheet, a hot-dip galvannealed steel sheet, an electrogalvanized steel sheet, or the like can be used for evaluation, and plating adhesion behavior or the like to a die can be evaluated for each type of plating.

Figure 3:
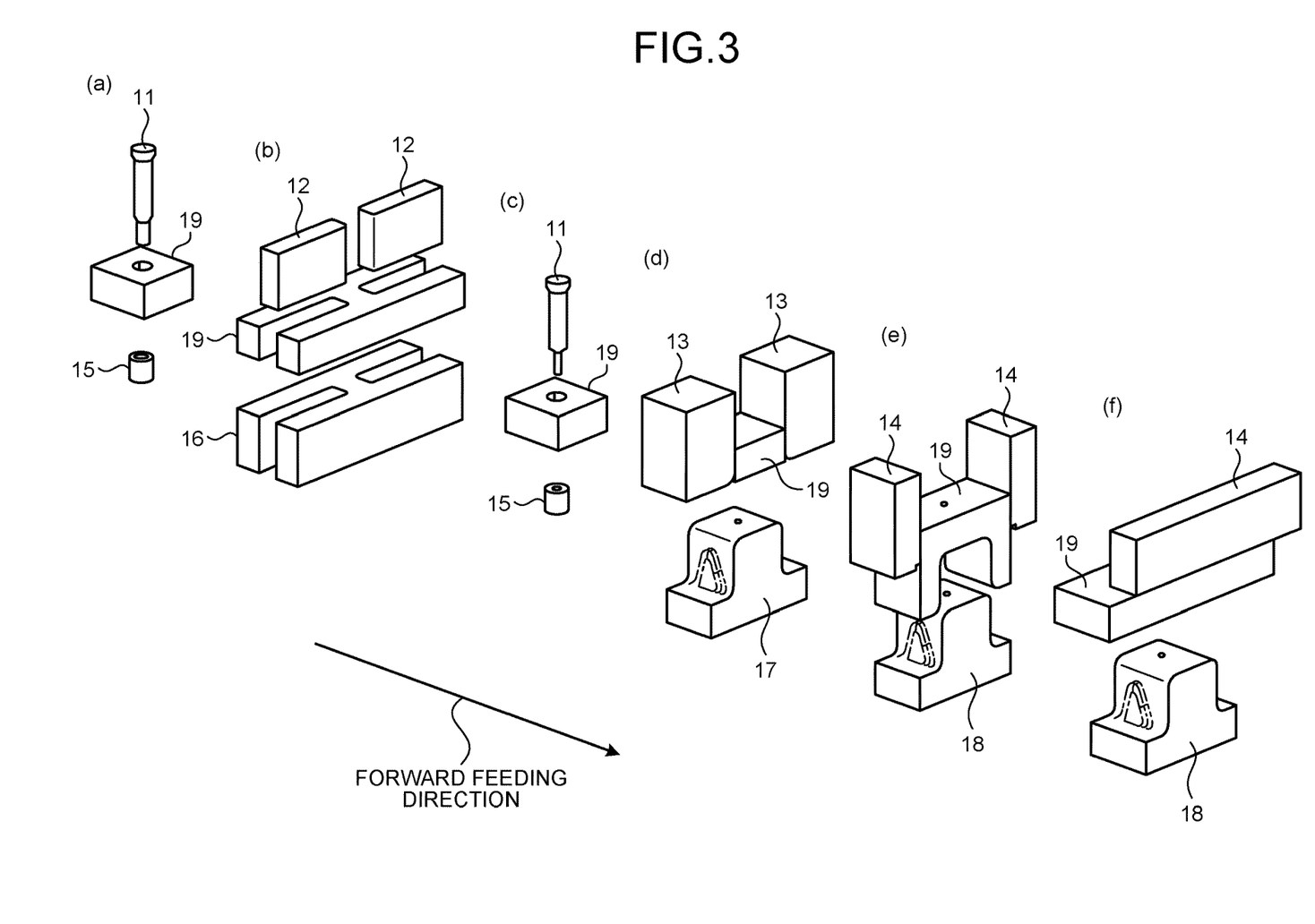
FIG. 3 is a schematic diagram illustrating a structure example of an evaluation die.
Figure 4:
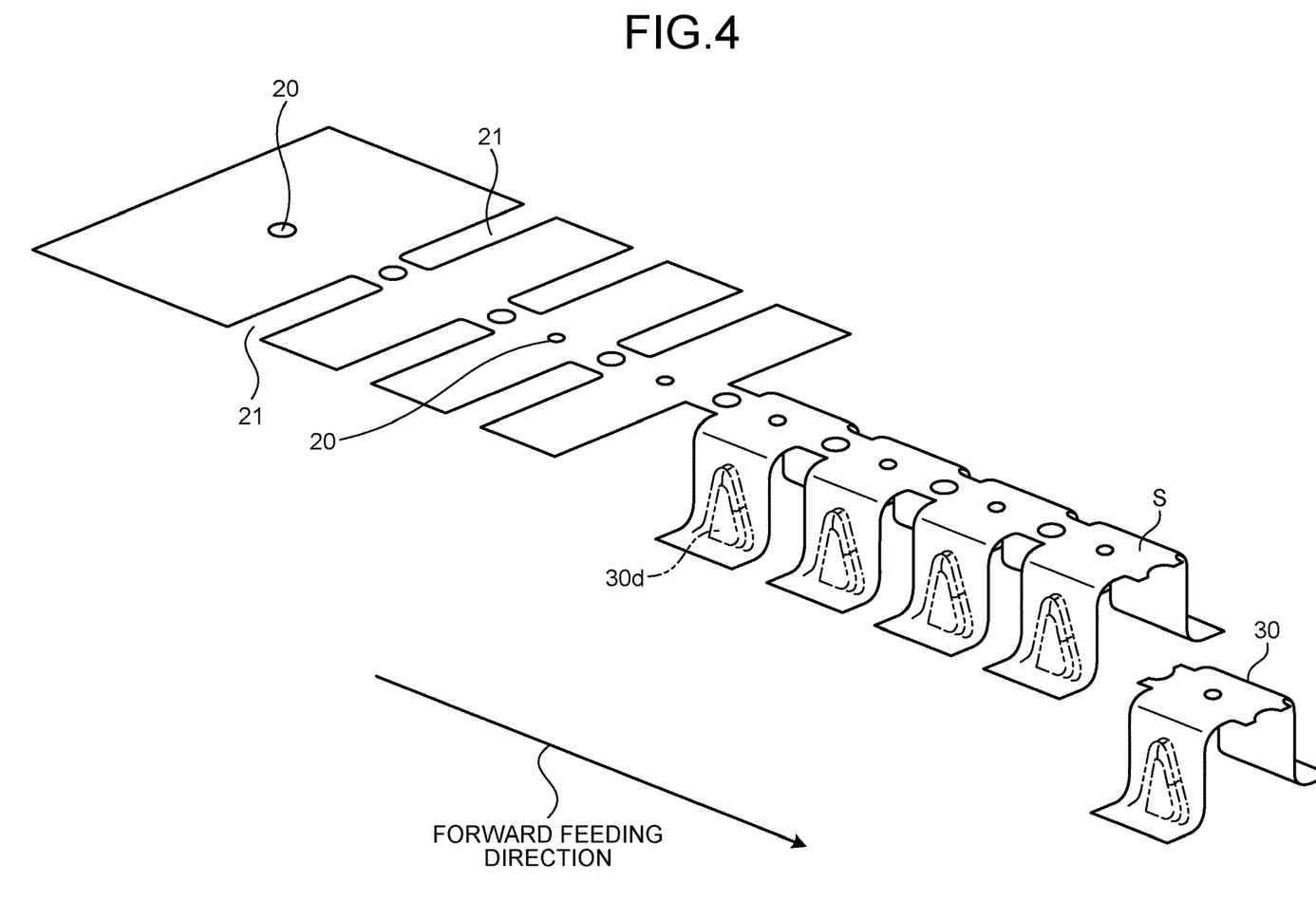
FIG. 4 is a diagram illustrating the shape of a coil material press-formed by the evaluation dies illustrated in FIG. 3.

FIGS. 3(a) to 3(f) are schematic diagrams illustrating a structure example of the evaluation dies 10. FIG. 4 is a diagram illustrating the shape of the coil material S press-formed by the evaluation dies 10 illustrated in FIG. 3. As illustrated in FIGS. 3(a) to 3(f), the evaluation dies 10 includes dies for performing six press-forming steps, namely, dies for a first piercing step, a blanking step, a second piercing step, a bending step, a flange trimming step, and a separate trimming step in order from the forward feeding direction of the coil material S. The dies are arranged side by side along a straight line and are collected in the evaluation dies 10. The dies include upper blades such as a piercing punch 11, blanking upper blades 12, bending blades 13, and trimming upper blades 14, lower blades such as a button die 15, a blanking lower blade 16, a punch 17, and a trimming lower blade 18, and sheet holders 19.

Since no large force is applied to the sheet holders 19 during press-forming, the sheet holders 19 may be made of, for example, general carbon steel such as S45C. Furthermore, in FIGS. 3(a) to 3(f), the sheet holders 19 of the dies are illustrated separately, however, the sheet holders 19 of the respective dies may be manufactured as an integral body connected in the evaluation dies 10. In addition, since a large force is applied to the upper blades and the lower blades during press-forming, the upper blades and the lower blades are evaluation targets for occurrence of a die damage. Therefore, each die steel material has a replaceable structure and can be fixed to the main body of the evaluation dies 10, which are manufactured by casting or the like, with a bolt or the like. These die steel materials can be replaced, as desired for the purpose of evaluation, with, for example, SKD11 of cold die steel or SKH51 of high-speed steel. In addition, regarding the coating treatment of the die steel material, it is possible to evaluate the die damage behavior by not performing the coating treatment on each die steel material or performing a desired coating treatment such as PVD coating.

Note that, an example as a replaceable structure of the die steel material is a structure that enables replacement in such a manner that the shear clearance of dies as a shearing means is always made constant by a positioning component such as a knock pin. Incidentally, the material and the surface coating of the dies in each of the press-forming steps are not necessarily the same. In addition, if the dies have bilaterally symmetrical shapes, a combination of die materials and surface coatings that are different on the right and the left may be used in order to enhance the evaluation efficiency.

Hereinafter, each of the press-forming steps will be described.

(First and Second Piercing Steps)

As illustrated in FIGS. 3(a) and 3(c), in the first and second piercing steps, piercing processing for forming a hole 20 (see FIG. 4) in the coil material S is performed using the piercing punch 11. However, although the hole 20 formed by the dies illustrated in FIG. 3(a) is preferably formed so as to insert a pilot pin for positioning the coil material S in a subsequent step, formation of the hole 20 by the dies illustrated in FIG. 3(c) is optional.

(Blanking Step)

As illustrated in FIG. 3(b), in the blanking step, an outer peripheral portion 21 (see FIG. 4) of a cross-section-hat-shaped component 30 is sheared in a U shape from the coil material S using the blanking upper blades 12 and the blanking lower blade 16. The length and the shape of the coil material S to be sheared may be determined depending on the shape of the cross-section-hat-shaped component 30 to be press-formed. Incidentally, the corner portions sheared in the U shape may have a right angle or may have a rounded shape.

(Bending Step)

As illustrated in FIG. 3(d), in the bending step, the coil material S is press-formed into a hat-shaped cross-sectional shape having a top portion face 30a and vertical wall portions 30b and flange portions 30c continuous with the top portion face 30a using the bending blades 13. Specifically, after the top portion face portion of the coil material S is held by the sheet holder 19, the vertical wall portions 30b and the flange portions 30c are press-formed by the bending blades 13. Note that the hat-shaped cross-sectional shape can be determined as desired. For example, the angle formed by the top portion face 30a and a vertical wall portion 30b is usually about 90 to 150 degrees, and a die damage is more likely to occur as the angle is closer to 90 degrees. In addition, bending may be performed at a bending angle less than or equal to 90 degrees using a cam mechanism or the like.

In the present embodiment, a vertical wall portion 30b includes a joggle shape 30d (see FIGS. 2 and 4). By forming the joggle shape portion through bending, a very high contact surface pressure is generated in the bending blades 13, and thus a die damage is likely to occur. As illustrated in FIGS. 2(a) to 2(c), by forming the joggle shape 30d only in one of the vertical wall portions 30b, the difference in the occurrence behavior of a die damage due to the presence or absence of the joggle shape can be evaluated by one time of press-forming. In addition, the joggle shape 30d may have any shape and may be a triangular shape or a rectangular shape. The closer the joggle shape 30d is to a rectangular shape, the more likely the die is damaged. Furthermore, the projecting height of the joggle shape 30d may be set as desired. A die damage is more likely to occur as the projecting height is higher.

(Flange Trimming Step)

Figure 5:
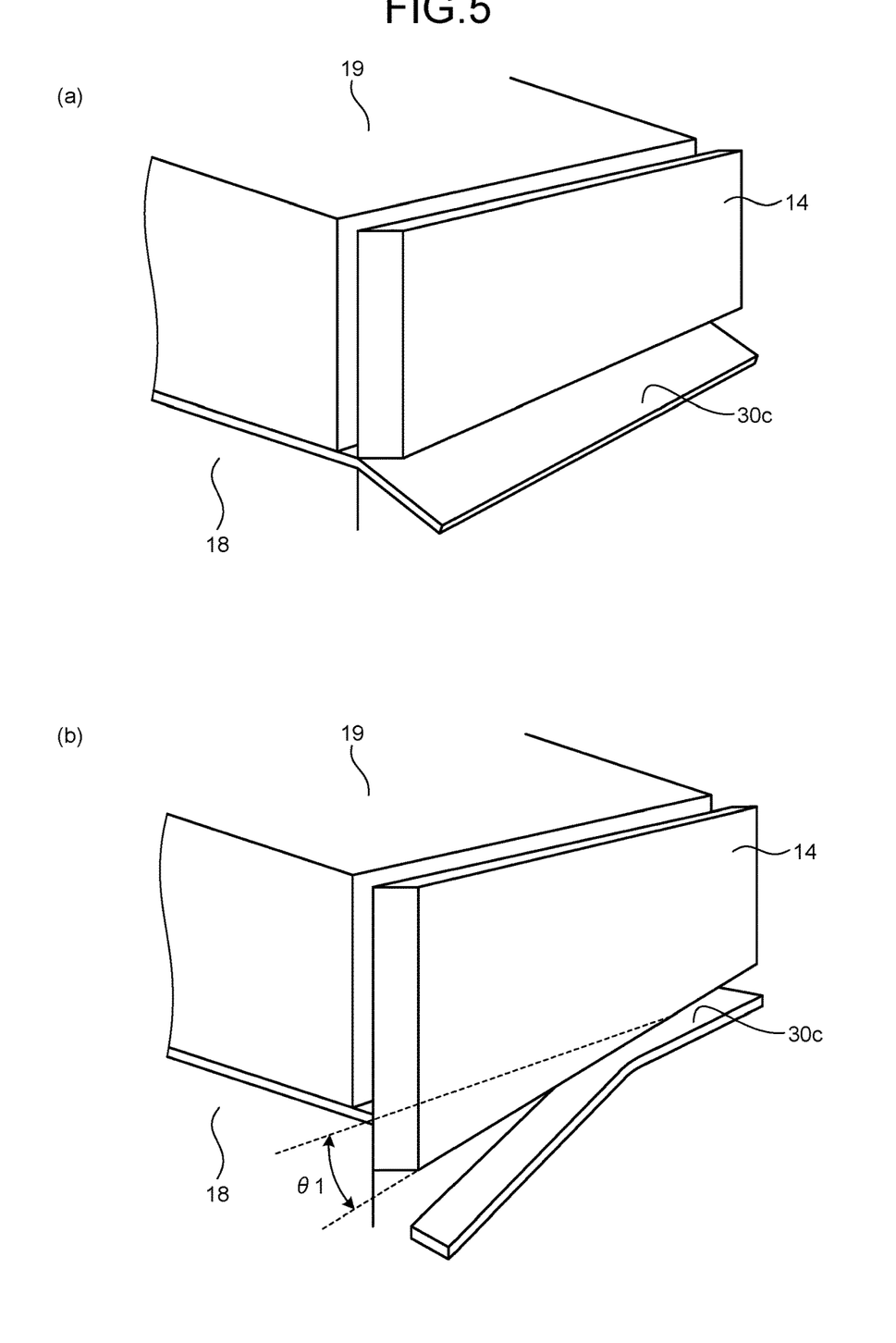
FIG. 5 is a diagram for explaining a flange trimming step.
Figure 6:
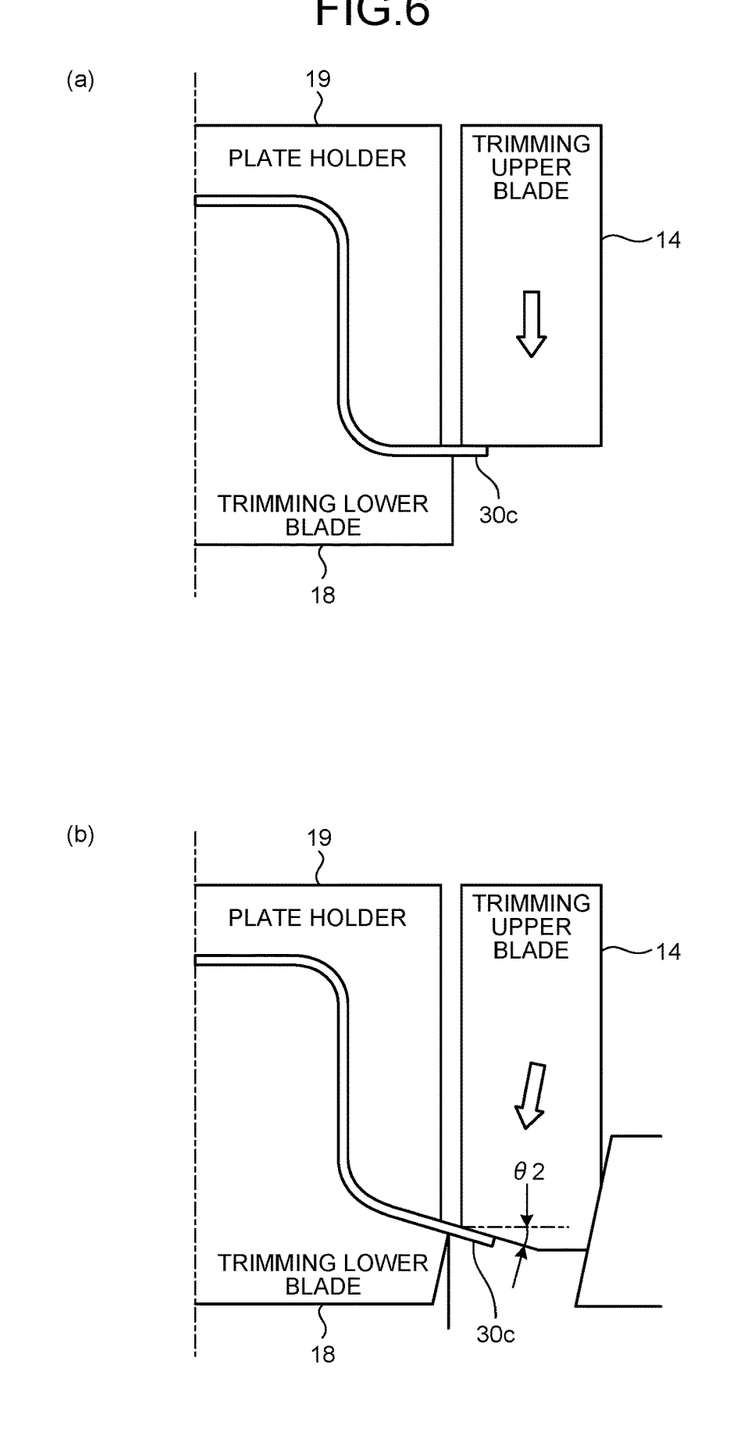
FIG. 6 is a diagram for explaining the flange trimming step.

As illustrated in FIG. 3(e), in the flange trimming step, parts of the flange portions 30c of the cross-section-hat-shaped component 30 press-formed by the bending step are sheared by the trimming upper blades 14. Specifically, after the cross-section-hat-shaped component 30 is held by the sheet holder 19 having the same shape as that of the cross-section-hat-shaped component 30, the flange portions 30c protruding from the sheet holder 19 are sheared by the trimming upper blades 14. As illustrated in FIG. 5(a), a trimming upper blade 14 may shear a flange portion 30c simultaneously in the width direction, or as illustrated in FIG. 5(b), a trimming upper blade 14 may have a shearing angle θ1 to have different timing for shearing a flange portion 30c in the width direction. Furthermore, as illustrated in FIG. 6(a), the flange portion 30c may be sheared in parallel to the pressing direction, or as illustrated in FIG. 6(b), the flange portion 30c may be sheared at a predetermined shear angle θ2 using a cam mechanism or the like. As described above, the flange trimming step can be designed as desired depending on a presumed mass production pressing step.

(Separate Trimming Step)

Figure 7:
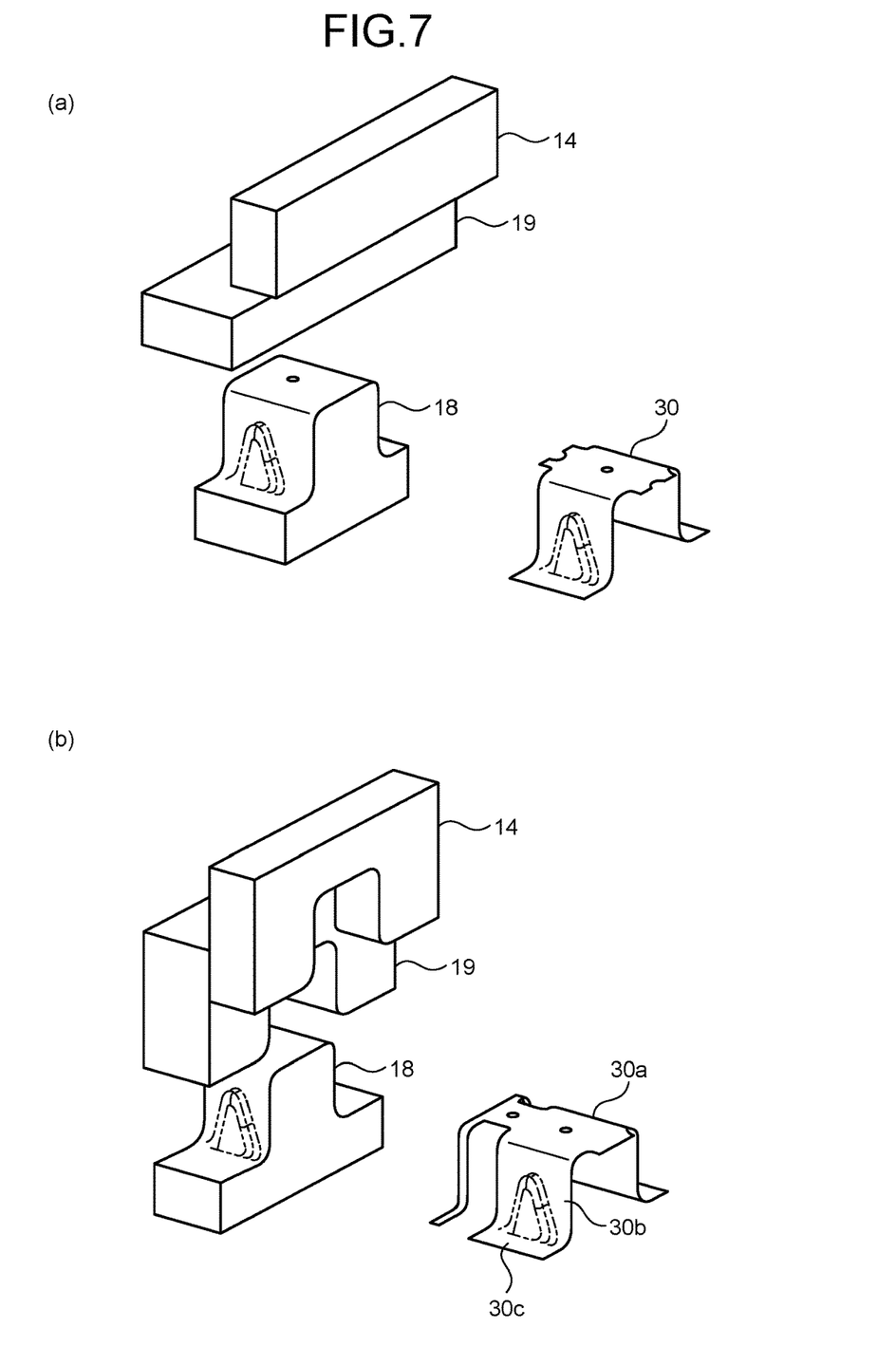
FIG. 7 is a diagram for explaining a separate trimming step.

As illustrated in FIG. 4, the coil material S is connected until the press-forming step before the separate trimming step, and one cross-section-hat-shaped component 30 is separated from the connected coil material S in the separate trimming step by the trimming upper blades 14 illustrated in FIG. 3(f). Note that, in the separate trimming step, as illustrated in FIG. 7(a), the coil material S may be cut horizontally by linearly shearing the coil material S at a connecting portion with a cross-section-hat-shaped component 30 that follows, or as illustrated in FIG. 7(b), the top portion face 30a, the vertical wall portions 30b, and the flange portions 30c may be cut vertically by shearing at a time. In general, a die damage is more likely to occur in vertical cutting than in flat cutting.

[Evaluation Method]

Next, a damage evaluation method for a press-forming die according to an embodiment of the invention will be described.

In the damage evaluation method for a press-forming die according to the embodiment of the invention, continuous press-forming is performed using the damage evaluation device 1 for a press-forming die according to the embodiment of the invention. Although it depends on the specifications of a pressing device to be used, for example, in a case where continuous press-forming is performed at 20 shots per minute (spm) in which press-forming is performed 20 times per minute, the time required for 1000 times of press-forming is about 50 minutes, and it is possible to perform many times of press-forming in a short time as compared with the sliding test or the press-forming test which are evaluation methods of die damages.

During the continuous press-forming, the press-forming may be performed without stopping up to a target number of times of press-forming, or the press-forming may be stopped at predetermined number of times of press-forming such as 100 times, 1000 times, 2000 times, or 5000 times, and the evaluation dies 10 may be taken out to observe the damage behavior of the die steel material in each of the press-forming steps. The observation method by the observation device 100 may be determined as desired depending on the evaluation purpose such as appearance observation by photographing, detailed observation by a portable small microscope, or investigation of the wear amount by imitating the die shape with a cured resin.

Note that, in addition to the observation of the damage behavior of the die steel material depending on the number of times of press-forming, the quality of the die steel material and the effectiveness of the surface coating may be evaluated by changing at least two or more conditions such as the quality of the die steel material, the presence or absence of the surface coating, or the type of the surface coating and comparing the damage behavior before and after the change.

EXAMPLE

In the present example, a cross-section-hat-shaped component formed by the evaluation dies was set to have a width of the top portion face of 50 mm, a height of the vertical walls of 50 mm, a length of the flanges of 30 mm, and a vertical length in the cross-section of 50 mm, and the boundaries between the top portion face and the vertical wall portions and between the vertical wall portions and the flanges have a bending radius of 10 mm. The top portion face was provided with connecting portions of 10 mm each for connecting with preceding and following cross-section-hat-shaped components. A triangular joggle shape having a length of the base of 40 mm, a height of 40 mm, and a projecting height of 5 mm was formed on one of the vertical wall portions of the cross-section-hat-shaped component. The bending radius of the joggle shape was set to 5 mm. The other vertical wall portion was not formed with the joggle shape. The angles formed by the top portion face and the vertical wall portions and the angles formed by the vertical wall portions and the flange portions were both set to 90 degrees. The target coil material was a non-plated high-tensile steel sheet having tensile strengths of 1470 MPa and 980 MPa, and the sheet thickness was set to 1.4 mm. The width of the coil material was set to 200 mm on the basis of the hat-shaped cross-sectional shape to be formed.

Evaluation dies were set to have six press-forming steps of a first piercing step, a blanking step, a second piercing step, a bending step, a flange trimming step, and a separate trimming step in order from the forward feeding direction of the coil material. In the first piercing step, a round hole having a diameter of 12 mm was punched out at the center of a connecting portion of a cross-section-hat-shaped component so that a pilot pin for positioning in a subsequent step can be inserted. In the second piercing step, a round hole having a diameter of 7 mm was punched out at the center of a top portion face of the cross-section-hat-shaped component. In the first and second piercing steps, the gap (clearance) between a piercing punch and a button die was set to 12.5% of the sheet thickness of the coil material.

In the blanking step, U-shaped outer peripheral portions having a length of 85 mm and a width of 20 mm were sheared symmetrically with respect to the center of the coil material. The corners were set to have a rounded shape with a radius of 10 mm. The gap (clearance) between a blanking blade and a lower blade was set to 12.5% of the sheet thickness of the coil material. In the bending step, the top portion face was held with a sheet holder, and then the cross-section-hat-shaped component was formed with the bending blades. The sheet holding force was set to 5 tons. In the flange trimming step, the cross-section-hat-shaped component was held with a sheet holder, and then flange portions on both sides were sheared by about 4 mm from the flange ends. The sheet holding force was set to 5 tons. The shearing angle and the shear angle were set to 0 degrees. The gap between a trimming blade and a lower blade was set to 12.5% of the sheet thickness of the coil material. The separate trimming step was set to linearly shear the center of a connecting portion of the cross-section-hat-shaped component. The gap between a trimming blade and a lower blade was set to 12.5% of the sheet thickness of the coil material.

Table 1 shows combinations of a coil material and die steel materials and a coating treatment in the six press-forming steps when a continuous press test was performed with the evaluation dies. By comparing the continuous press conditions of No. 1 and No. 2, it is possible to investigate the influence of the difference in the die steel material on the die damage behavior. By comparing the continuous press conditions of No. 1 and No. 3, it is possible to investigate the influence of the difference in the material strength of the coil material on the die damage. It is possible to investigate the influence of the presence or absence of surface coating on the die damage by comparing the continuous press conditions of No. 1 and No. 5 or No. 2 and No. 4. By comparing the continuous press conditions of No. 5 and No. 6, it is possible to investigate the influence of the difference in the type of the surface coating on the die damage. Note that, for the die steel material in the bending step, in the case of no surface coating, seizure of the coil material occurs in several times of press-forming, and therefore, the surface coating treatment was performed for all the continuous press conditions.

TABLE 1

| No. | Coil Material | Piercing Step | | Blanking Step | | Piercing Step | |
|---|---|---|---|---|---|---|---|
| | | Piercing Punch | Button Die | Blanking Blade | Lower Blade | Piercing Punch | Button Die |
| 1 | 1470 Mpa | Steel Material A No Coating | Steel Material B No Coating | Steel Material A No Coating | Steel Material A No Coating | Steel Material A No Coating | Steel Material B No Coating |
| 2 | 1470 Mpa | Steel Material B No Coating | Steel Material B No Coating | Steel Material B No Coating | Steel Material A No Coating | Steel Material B No Coating | Steel Material B No Coating |
| 3 | 980 Mpa | Steel Material A No Coating | Steel Material B No Coating | Steel Material A No Coating | Steel Material A No Coating | Steel Material A No Coating | Steel Material B No Coating |
| 4 | 1470 Mpa | Steel Material B Coating A | Steel Material B No Coating | Steel Material B Coating A | Steel Material A No Coating | Steel Material B Coating A | Steel Material B No Coating |
| 5 | 1470 Mpa | Steel Material A Coating A | Steel Material B No Coating | Steel Material A Coating A | Steel Material A No Coating | Steel Material A Coating A | Steel Material B No Coating |
| 6 | 1470 Mpa | Steel Material A Coating B | Steel Material B No Coating | Steel Material A Coating B | Steel Material A No Coating | Steel Material A Coating B | Steel Material B No Coating |

| No. | Bending Step | | Flange Trimming Step | | Separate Trimming Step | |
|---|---|---|---|---|---|---|
| | Bending Blade | Punch | Trimming Blade | Lower Blade | Trimming Blade | Lower Blade |
| 1 | Steel Material A Coating A | Steel Material A No Coating | Steel Material A No Coating | Steel Material A No Coating | Steel Material A No Coating | Steel Material A No Coating |
| 2 | Steel Material B Coating A | Steel Material A No Coating | Steel Material B No Coating | Steel Material A No Coating | Steel Material B No Coating | Steel Material A No Coating |
| 3 | Steel Material A Coating A | Steel Material A No Coating | Steel Material A No Coating | Steel Material A No Coating | Steel Material A No Coating | Steel Material A No Coating |
| 4 | Steel Material B Coating A | Steel Material A No Coating | Steel Material B Coating A | Steel Material A No Coating | Steel Material B Coating A | Steel Material A No Coating |
| 5 | Steel Material A Coating A | Steel Material A No Coating | Steel Material A Coating A | Steel Material A No Coating | Steel Material A Coating A | Steel Material A No Coating |
| 6 | Steel Material A Coating B | Steel Material A No Coating | Steel Material A Coating B | Steel Material A No Coating | Steel Material A Coating B | Steel Material A No Coating |

A continuous press test was performed using the above evaluation dies. A pressing device used was a mechanical pressing device with a pressing capability of 250 tons, and continuous press-forming was performed at a forming speed of 30 spm. After one time of press-forming, the coil material was loaded to the evaluation dies at a pitch of 70 mm by an uncoiler leveler. As for lubrication of the coil material, rustproof oil at the time of receiving the coil was used as it is. The continuous press test was performed, and after the number of times of pressing reached 100, 1000, 2000, 5000, 8000, and 10000 times, the evaluation dies was taken out from the pressing device, and the damage behavior of the die steel material was observed. The damage behavior of the die steel material at the time of each observation is shown in Tables 2 to 8. Table 2 shows the damage behavior of the die steel material in the first piercing step, Table 3 shows the damage behavior of the die steel material in the blanking step, Table 4 shows the damage behavior of the die steel material in the second piercing step, Tables 5 and 6 show the damage behavior of the die steel material with and without the joggle shape in the bending step, and Tables 7 and 8 show the damage behavior of the die steel material with and without the joggle shape in the flange trimming step. A case where there was almost no damage was evaluated as "good", a case where the length of a damage was a minute damage of less than 1 mm was evaluated as "fair", and a case where the length of a damage was a large damage greater than or equal to 1 mm was evaluated as "bad".

TABLE 2

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | No Coating | good | good | good | bad | bad | bad |
| 2 | 1470 | B | No Coating | good | good | good | fair | fair | bad |
| 3 | 980 | A | No Coating | good | good | good | good | good | good |
| 4 | 1470 | B | A | good | good | good | good | good | good |
| 5 | 1470 | A | A | good | good | good | bad | bad | bad |
| 6 | 1470 | A | B | good | good | bad | bad | bad | bad |

TABLE 3

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | No Coating | good | fair | fair | bad | bad | bad |
| 2 | 1470 | B | No Coating | good | good | good | good | bad | bad |
| 3 | 980 | A | No Coating | good | good | good | good | fair | fair |
| 4 | 1470 | B | A | good | good | good | good | fair | fair |
| 5 | 1470 | A | A | good | fair | fair |  | bad | bad |
| 6 | 1470 | A | B | good | fair |  | bad | bad | bad |

TABLE 4

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | No Coating | good | good | good | bad | bad | bad |
| 2 | 1470 | B | No Coating | good | good | good | good | good | good |
| 3 | 980 | A | No Coating | good | good | good | good | good | bad |
| 4 | 1470 | B | A | good | good | good | good | good | good |
| 5 | 1470 | A | A | good | good | good | good | good | good |
| 6 | 1470 | A | B | good | good | good | bad | bad | bad |

TABLE 5

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | A | good | good | good | bad | bad | bad |
| 2 | 1470 | B | A | good | good | good | good | good | good |
| 3 | 980 | A | A | good | good | good | fair | bad | bad |
| 4 | 1470 | B | A | good | good | good | good | good | good |
| 5 | 1470 | A | A | good | good | good | bad | bad | bad |
| 6 | 1470 | A | B | good | good | bad | bad | bad | bad |

TABLE 6

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | A | good | good | good | good | good | good |
| 2 | 1470 | B | A | good | good | good | good | good | good |
| 3 | 980 | A | A | good | good | good | good | good | good |
| 4 | 1470 | B | A | good | good | good | good | good | good |
| 5 | 1470 | A | A | good | good | good | good | good | good |
| 6 | 1470 | A | B | good | good | good | bad | bad | bad |

TABLE 7

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | No Coating | good | good | good | good | good | bad |
| 2 | 1470 | B | No Coating | good | good | good | good | good | good |
| 3 | 980 | A | No Coating | good | good | good | good | good | bad |
| 4 | 1470 | B | A | good | good | good | good | good | good |
| 5 | 1470 | A | A | good | good | good | good | good | bad |
| 6 | 1470 | A | B | good | good | good | good | bad | bad |

TABLE 8

| No. | Coil Material | Die Steel Material Steel Material | Die Steel Material Coating | Number of Times of Press-Forming 100 | 1,000 | 2,000 | 5,000 | 8,000 | 10,000 |
|---|---|---|---|---|---|---|---|---|---|
| 1 | 1470 | A | No Coating | good | fair | bad | bad | bad | bad |
| 2 | 1470 | B | No Coating | good | good | good | fair | bad | bad |
| 3 | 980 | A | No Coating | good | good | good | fair | bad | bad |
| 4 | 1470 | B | A | good | good | good | fair | fair | fair |
| 5 | 1470 | A | A | good | fair | fair | bad | bad | bad |
| 6 | 1470 | A | B | good | fair | bad | bad | bad | bad |

From the above results, it was confirmed that die damage in each press-forming step can be quantitatively evaluated with the number of times of press-forming equivalent to that of mass production pressing. By the continuous press test in which the combination of the die steel material and the surface coating in the press-forming steps was changed, it was also confirmed that a die damage occurs earlier as the material strength of the coil material is higher. Furthermore, it was also confirmed that the die steel material B is superior in durability to the die steel material A and that damages are less likely to occur in a case where surface coating treatment is performed. It was further confirmed that, in a case of the same coil material and the same die steel material, the surface coating A is superior in durability to the surface coating B. Focusing on the forming conditions, the die was damaged earlier in the bending blade with the joggle shape than in the bending blade without the joggle shape. This is because the contact surface pressure between the material and the die at the time of forming is higher in the case where there is a joggle shape and that the surface coating and the die steel material are more likely to be damaged. In addition, focusing on the shearing conditions, in the flange trimming step, the die was damaged earlier in the trimming blade on the side without the joggle shape than in the trimming blade on the side with the joggle shape. Since no shape is formed on the side without the joggle shape and the rigidity of the vertical wall is low, spring back of the cross section is larger than that on the side with the joggle shape. This is because holding of the sheet at the time of flange trimming is not sufficient, and shearing is unstable such as that the flange ends are displaced. As a result, it has been confirmed that, according to the present invention, it is possible to quantitatively evaluate die damages generated in mass production press-forming of automobile body frame parts and the like to which a high-tensile steel sheet is applied, for predetermined die steel material and surface coating treatment and to provide selection criteria for die steel material and surface coating treatment to be used in mass production press-forming.

Although the embodiments applied with the invention made by the present inventors have been described above, the present invention is not limited by the description and the drawings included as a part of the disclosure of the present invention according to the embodiments. That is, other embodiments, examples, operation technology, and the like implemented by those skilled in the art on the basis of the present embodiments are all included in the scope of the invention.

INDUSTRIAL APPLICABILITY

According to the present invention, it is possible to provide a damage evaluation device and a damage evaluation method for a press-forming die that are capable of quantitatively evaluating a die damage for predetermined die steel material and coating treatment.

REFERENCE SIGNS LIST

1 DAMAGE EVALUATION DEVICE FOR PRESS-FORMING DIE
2 PAY-OFF REEL
3 UNCOILER LEVELER
4 PRESSING DEVICE
5 CONVEYANCE DEVICE
6 SCRAP BAG
10 EVALUATION DIE
11 PIERCING PUNCH
12 BLANKING UPPER BLADE
13 BENDING BLADE
14 TRIMMING UPPER BLADE
15 BUTTON DIE
16 BLANKING LOWER BLADE
17 PUNCH
18 TRIMMING LOWER BLADE
19 SHEET HOLDER
20 HOLE
21 OUTER PERIPHERAL PORTION
30 CROSS-SECTION-HAT-SHAPED COMPONENT
30a TOP PORTION FACE
30b VERTICAL WALL PORTION
30c FLANGE PORTION
30d JOGGLE SHAPE
100 OBSERVATION DEVICE
S COIL MATERIAL

The invention claimed is:

1. A damage evaluation device for a press-forming die, the damage evaluation device comprising:
   evaluation dies installed in a pressing device configured to press-form a metal material; and
   an observation device configured to observe damage behavior of a die steel material and surface coating constituting the evaluation dies,
   wherein the evaluation dies include:
      a perforating unit configured to form a hole in the metal material;
      a first shearing unit configured to shear the metal material in which the hole is formed into a predetermined metal component shape; and
      a second shearing unit configured to separate a metal component from the metal material, and
   dies of the perforating unit, the first shearing unit and the second shearing unit are formed of the die steel material and have a structure that enables replacement with another die made of predetermined material and applied with predetermined surface coating treatment.

2. The damage evaluation device for a press-forming die according to claim 1, wherein
   the evaluation dies include:
      a press-forming unit configured to press-form the metal material after shearing by the first shearing unit into a shape having a hat-shaped cross-section, the shape having a top portion face, vertical wall portions continuous with the top portion face, and flange portions continuous with the vertical wall portions; and
      a third shearing unit configured to shear a part of the flange portions,
   dies of the press-forming unit and the third shearing unit are formed of the die steel material and have a structure that enables replacement with another die made of predetermined material and applied with predetermined surface coating treatment, and
   the second shearing unit is configured to separate a metal component having the shape having the hat-shaped cross-section from the metal material after shearing by the third shearing unit.

3. The damage evaluation device for a press-forming die according to claim 2, wherein the shape having the hat-shaped cross-section has a protruding shape on one of the vertical wall portions.

4. A damage evaluation method for a press-forming die, the damage evaluation method comprising:
   a step of observing damage behavior of a die steel material and surface coating constituting evaluation dies after press-forming is repeated on a metal material for predetermined number of times using the evaluation dies installed in a pressing device,
   wherein the evaluation dies include:
      a perforating unit configured to form a hole in the metal material;
      a first shearing unit configured to shear the metal material in which the hole is formed into a predetermined metal component shape; and
      a second shearing unit configured to separate a metal component from the metal material, and
   dies of the perforating unit, the first shearing unit and the second shearing unit are formed of the die steel material and have a structure that enables replacement with another die made of predetermined material and applied with predetermined surface coating treatment.

5. The damage evaluation method for a press-forming die according to claim 4,
   wherein the evaluation dies include:
      a press-forming unit configured to press-form the metal material after shearing by the first shearing unit into a shape having a hat-shaped cross-section, the shape having a top portion face, vertical wall portions continuous with the top portion face, and flange portions continuous with the vertical wall portions; and
      a third shearing unit configured to shear a part of the flange portions,
   dies of the press-forming unit and the third shearing unit are formed of the die steel material and have a structure that enables replacement with another die made of predetermined material and applied with predetermined surface coating treatment, and the second shearing unit is configured to separate a metal component having the shape having the hat-shaped cross-section from the metal material after shearing by the third shearing unit.

6. The damage evaluation method for a press-forming die according to claim 5, wherein the shape having the hat-shaped cross-section has a protruding shape on one of the vertical wall portions.

\* \* \* \* \*